United States Patent
Guillouard et al.

(10) Patent No.: US 8,948,763 B2
(45) Date of Patent: Feb. 3, 2015

(54) METHOD FOR ALLOCATING OF AT LEAST ONE ACCESS POINT TO A MOBILE TERMINAL IN A CELLULAR NETWORK, CORRESPONDING TERMINAL, MOBILE SERVER AND PROGRAMS

(75) Inventors: Karine Guillouard, Chantepie (FR); Philippe Bertin, Acigne (FR); Servane Bonjour, Acigne (FR); Julien Montavont, Strasbourg (FR); Thomas Noel, Westhouse (FR)

(73) Assignee: France Telecom, Paris (FR)

( * ) Notice: Subject to any disclaimer, the term of this patent is extended or adjusted under 35 U.S.C. 154(b) by 846 days.

(21) Appl. No.: 12/279,293

(22) PCT Filed: Feb. 13, 2007

(86) PCT No.: PCT/FR2007/050789
§ 371 (c)(1),
(2), (4) Date: Aug. 13, 2008

(87) PCT Pub. No.: WO2007/093734
PCT Pub. Date: Aug. 23, 2007

(65) Prior Publication Data
US 2009/0017825 A1    Jan. 15, 2009

(30) Foreign Application Priority Data
Feb. 13, 2006  (FR) .................................... 06 01251

(51) Int. Cl.
*H04W 36/32*   (2009.01)
*H04W 48/08*   (2009.01)
*H04W 36/08*   (2009.01)

(52) U.S. Cl.
CPC .............. *H04W 48/08* (2013.01); *H04W 36/08* (2013.01); *H04W 36/32* (2013.01)

USPC ..... 455/440; 455/436; 455/432.1; 455/435.2; 455/437; 455/438; 455/456.1; 455/561; 370/328; 370/329; 370/331; 370/338

(58) Field of Classification Search
CPC ...... H04W 36/08; H04W 36/32; H04W 48/08
USPC ................ 455/432.1–453, 456.1, 456.6, 509; 370/331, 338, 328, 333
See application file for complete search history.

(56) References Cited

U.S. PATENT DOCUMENTS 7,561,068 B1 *  7/2009  Denker et al. ................. 340/988
7,894,812 B1 *  2/2011  Durig et al. ................. 455/432.3
(Continued)

FOREIGN PATENT DOCUMENTS

| WO | 2004027445 A | 4/2004 |
| WO | 2005120017 A | 12/2005 |

OTHER PUBLICATIONS

International Search Report of Counterpart Application No. PCT/FR2007/050789 filed on Feb. 13, 2007.
French Search Report of Counterpart Application No. FR06/01251 filed on Feb. 13, 2006.
(Continued)

*Primary Examiner* — Babar Sarwar
(74) *Attorney, Agent, or Firm* — David D. Brush; Westman, Champlin & Koehler, P.A.

(57) ABSTRACT

A method is provided for allocating at least one access point to a mobile terminal in a cellular network formed by multiple cells each controlled by an access point, wherein the mobile terminals move about. The method includes the following steps: locating a mobile terminal inside a current cell; identifying, using the locating, a target cell with which the terminal is likely to be connected; transmitting in advance to the terminal a target context, comprising at least one identifier of the access point of the target cell; implementing a procedure for connecting said terminal to the access point of the target cell, based on predetermined cell modification criterion.

14 Claims, 3 Drawing Sheets

(56) References Cited

U.S. PATENT DOCUMENTS

| | | | |
|---|---|---|---|
| 2004/0121774 A1* | 6/2004 | Rajkotia et al. | 455/441 |
| 2004/0203779 A1* | 10/2004 | Gabara | 455/436 |
| 2007/0197237 A1* | 8/2007 | Powell et al. | 455/466 |
| 2009/0011773 A1* | 1/2009 | Balachandran et al. | 455/456.1 |
| 2010/0029279 A1* | 2/2010 | Lee et al. | 455/436 |

OTHER PUBLICATIONS

English Translation of the Written Opinion of Counterpart Application No. PCT/FR2007/050789 Filed on Feb. 13, 2007.

Youssef Khouaja et al., "Hierarchical Mobility Controlled by the Network" Multi-Access, Mobility and Teletraffic for Wireless Communications, vol. 6, 2002.

* cited by examiner

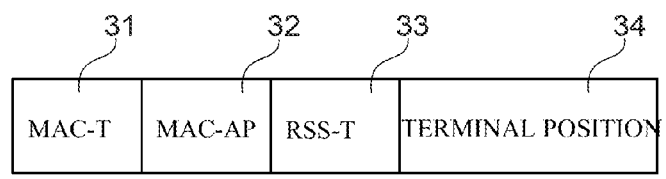
Fig. 3A
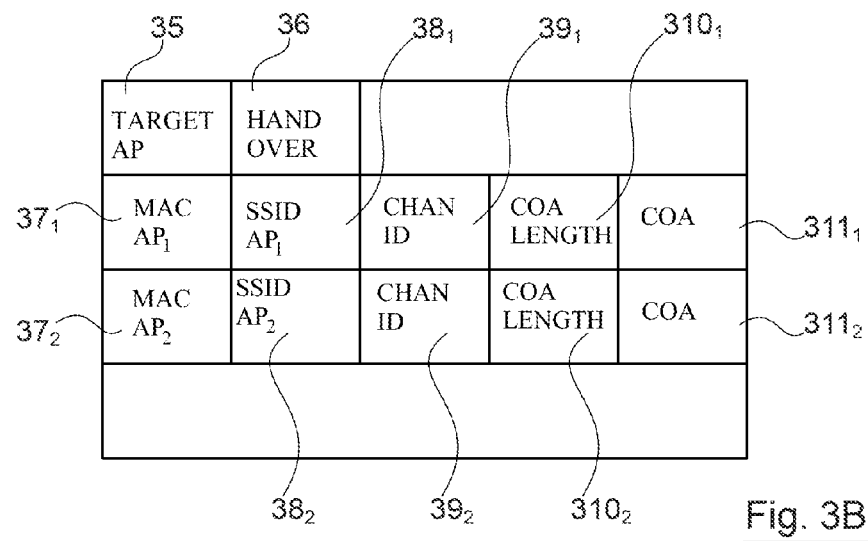
Fig. 3B
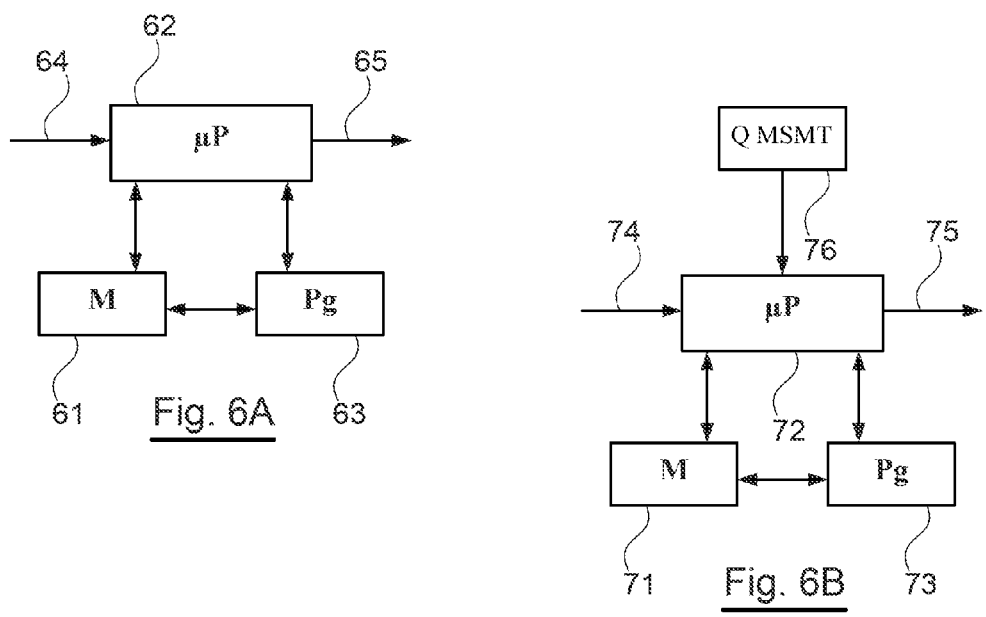
Fig. 6A
Fig. 6B

METHOD FOR ALLOCATING OF AT LEAST ONE ACCESS POINT TO A MOBILE TERMINAL IN A CELLULAR NETWORK, CORRESPONDING TERMINAL, MOBILE SERVER AND PROGRAMS

CROSS-REFERENCE TO RELATED APPLICATIONS

This Application is a Section 371 National Stage Application of International Application No. PCT/FR2007/050789, filed Feb. 13, 2007 and published as WO 2007/093734 on Aug. 23, 2007, not in English.

STATEMENT REGARDING FEDERALLY SPONSORED RESEARCH OR DEVELOPMENT

None.

THE NAMES OF PARTIES TO A JOINT RESEARCH AGREEMENT

None.

FIELD OF THE DISCLOSURE

The field of the disclosure is that of radio communications in cellular networks. More specifically, the disclosure relates to improving the passage of a mobile terminal from a current cell to a neighboring cell, when a terminal moves within the network.

The disclosure can be applied for example in the field of networks with WiFi type radio access points.

BACKGROUND OF THE DISCLOSURE

This mechanism is generally called a "handover" mechanism.

According to classic techniques, the handover procedure requires a phase of negotiation between radio access points, requiring a phase of discovery of the neighboring access points.

Various approaches have been proposed to simplify and accelerate the handover procedure. Thus, there is a known technique disclosed in Y. Khouaja, K. Guillouard, J M Bonnin, Ph. Bertin, "Hierarchical Mobility Controlled by the Network", Multi-Access, Mobility and Teletraffic for Wireless Communications, vol. 6, 2002 implementing a mobility manager (MM) in a database based on the IP protocol by which the network operator can efficiently control the mobility of the IP terminals (also called mobile nodes or MN (the various abbreviations used here below are defined in section 6.1) that it serves.

The essential elements of this approach are the following:
 sending information back from MN to MM on the quality of transmission between MN and various neighboring access points (AP) when the quality of transmission with the current AP reaches a critical threshold.
 requesting a change of AP by the MN (without specifying the new target AP);
 change of AP managed by the MM with duplication of the data transmitted by the MN (IP Packets) between the MM and the former AP on the one hand and between the MM and the new AP on the other hand;
 implanting one MM per mobility domain containing a certain number of APs associated with a database (DB).

One drawback of this technique is that the terminal must perform a measurement phase for its current point as well as for all the neighboring access points indicated by the network. As soon as the radio signal of the terminal falls below a critical threshold, it must send back all the measurements obtained (relative to current access point and neighboring access points). These operations consume processing time and memory capacity, especially for low-capacity or "light" terminals.

Other improvements have been proposed, especially by the firm CISCO. These improvements include more specifically the technique known as the CISCO WDS Solution (registered marks). The value of these techniques is that they optimize handover time for a terminal passing from one access point to another in a secure WLAN network. These main characteristics are:
 reducing the access point discovery phase through a list of neighboring access points that are built dynamically as and when the terminals move about;
 accelerating the authentication phase by basing the operation on a localized authentication server.

However, even though reduced, the phase of discovery of the point of access is still present.

SUMMARY

An aspect of the disclosure relates to a method of allocation of at least one access point, in a cellular network formed by a plurality of cells each controlled by an access point, within which mobile terminals move about. According to an embodiment of the invention, this method comprises the following steps:
 locating a mobile terminal inside a current cell;
 identifying, through said location, a target cell with which said terminal is likely to get connected;
 transmitting a target context to said terminal by anticipation, this target context comprising at least one identifier of the access point of said target cell;
 implementing a procedure for connecting said terminal to said access point of the target cell according to a predetermined cell change criterion.

Thus, an embodiment of the invention eliminates the phase of discovery of the neighboring access points by anticipating the transmission of the necessary pieces of information.

It must be noted that this phase, in the prior art techniques, is one of the biggest components in the duration of a handover. An embodiment of the invention overcomes the effects of this component by directly determining a target access point according to a specific means. When this is done, it becomes possible to optimize the handover time by preparing the new context of connection in advance.

It may be recalled that prior work has shown that 90% of the handover time between two access points, in the case of IEEE 802.11 standard, is constituted by the duration of the access point discovery phase. An embodiment of the invention thus reduces handover time to about 20 ms. This result can be compared with the result obtained by the WDS CISCO solution, currently the most efficient solution, which reduces handover time only to about 50 ms.

Advantageously, said location step is implemented when at least one predetermined quality criterion has reached a first threshold. This thresholding operation can be done simply, on the basis of a criterion such as the power of the received signal. It is also possible to combine several criteria such as those listed here below.

In a preferred embodiment of the invention, said location step is implemented by said mobile terminal. This location can then comprise the following steps:
- detecting that at least one of said predetermined criteria has obtained the first corresponding threshold;
- determining the location of said mobile terminal;
- transmitting location coordinates to a mobility controller so that this controller can determine a target cell.

Advantageously, said predetermined change-over criterion is identical to at least one of said predetermined quality criteria, said change-over being implemented when a second threshold is reached.

Preferably, at least one of the steps belonging to the group comprising said location step and/or a step of measurement of said quality criterion or quality criteria is implemented in said mobile terminals.

The terminal then sends this information back to the mobility controller.

Said quality criterion or criteria can belong to the group comprising:
- a received signal level;
- a change in mode of transmission and/or reception;
- a type of modulation used;
- a signal-to-noise ratio;
- an error rate;
- a collision rate;
- a mean access time;
- a rate of "data groups sent and not received";
- a data group (frames and/or packets) retransmission rate.

According to an advantageous characteristic of an embodiment of the invention, the step of transmission of a target context is implemented only when an analysis of the location indicates that said terminal is in the vicinity of a target cell, according to a predetermined criterion of location.

It is indeed worthwhile to take account of the fact that the terminal is close or not close to a boundary of the current cell.

Preferably, said target context comprises at least one identifier of said target cell represented by an IP type address, a MAC type address or at least one piece of information used to reconstitute such an address.

In different modes of implementation of the invention, said target context may also include at least one of the pieces of information belonging to the following group:
- security information;
- encryption information;
- authentication information;
- information on the technique of access and/or transmission implemented by the target access point;
- an address of said terminal, of an IP type, a MAC type address or at least one piece of information to reconstitute an address of this kind.

In a particular embodiment, said step of transmission of a target context is, at least in predetermined conditions, complemented by the transmission of at least one subsidiary target context, to be used in the event that, after a connection attempt, the connection to the access point identified in the target context is not suitable.

An embodiment of the invention also relates to mobile terminals intended for implementation in a cellular network implementing at least certain aspects of the above method. Such a terminal comprises especially:
- means of location inside a current cell and of transmission of information on location to a mobility controller;
- means of reception in advance of a target context comprising at least one identifier of the access point of a target cell towards which it is likely to move;
- means of connecting said terminal to said access point of the target cell according to a predetermined cell change criterion.

Advantageously, the terminal also comprises means for the assessment of at least one quality criterion driving said means of transmission of location information and/or said connection means.

An embodiment of the invention also pertains to a method to control the allocation of at least one access point implemented in said mobile terminal. This method comprises especially the following steps:
- location of said terminal inside a current cell and transmission of information on location to a mobility controller;
- reception by anticipation of a target context comprising at least one identifier of the access point of a target cell towards which it is likely to move;
- connection to said access point of the target cell according to a predetermined cell change criterion.

An embodiment of the invention also pertains to a computer program product downloadable from a communications network and/or stored in a computer-readable carrier and/or executable by a microprocessor and comprising program code instructions for the implementation of this method in a terminal.

An embodiment of the invention also pertains to a mobility controller of a cellular network implementing at least certain aspects of the above-described method. Such a mobility controller comprises especially:
- means of reception of information on location transmitted by a mobile terminal;
- means of determining, on the basis of said information on location, of a target context comprising at least one identifier of the access point of a target cell towards which said terminal is likely to move;
- means of transmitting said target context to said terminal by anticipation.

An embodiment of the invention also pertains to the method implemented in a mobility controller, and comprising especially the following steps:
- reception of information on location transmitted by a mobile terminal;
- determining, on the basis of said information on location, of a target context comprising at least one identifier of the access point of a target cell towards which said terminal is likely to move;
- transmitting said target context to said terminal in advance.

An embodiment of the invention also pertains to a computer program product downloadable from a communications network and/or stored in a computer-readable carrier and/or executable by a microprocessor and comprising program code instructions for the implementation of this method in a mobility server.

BRIEF DESCRIPTION OF THE DRAWINGS

Other features and advantages shall appear more clearly from the following description of a preferred embodiment of the invention, given by way of a simple illustrative and non-exhaustive example, and from the appended drawings of which:

FIGS. 3A and 3B present the structure of two of the messages exchanged in the system of FIG. 2:

FIG. 3A shows a message sent out by a terminal to the mobility controller;

FIG. 3B shows a message sent out by the controller to a terminal;

FIGS. 6A and 6B schematically illustrate the structures of a mobility controller and a terminal respectively, implementing an embodiment of the invention.

DETAILED DESCRIPTION OF ILLUSTRATIVE EMBODIMENTS

1. Definition of Abbreviations Used

In the present disclosure, the following abbreviations and definitions are used:

MC for Mobility Controller: accesses a database which keeps all the information on the points of access of the domain that it manages: information on the location of the access points, information required by a mobile node to get attached to an access point, information on configuration of the access points (position, MAC address, channel busy, range etc). An MC is associated with a mobility domain;

AP for Access Point: provides for the attachment at the radio level of the mobile node to the domain, links up with an IP access router.

AR for Access Router, ensures the attachment of the mobile node to the IP field through an AP;

Mobility domain: set of ARs and APs. A mobility domain can be linked up to the Internet.

MN for Mobile Node: IP terminal.

2. Main Aspects of an Embodiment of the Invention

An embodiment of the invention proposes a novel approach to overcome the effects of the access point discovery phase in a "handover" procedure.

The general principle of an embodiment of the invention relies on a two-stage approach: a stage of anticipation or preparation of the handover and a phase of handover, on the basis of information transmitted during the anticipation phase.

To this end, an embodiment of the invention implements two levels of measurement (using one or more criteria which may or may not be the same):

the first level is used to detect the fact that the terminal is approaching a boundary of a cell and must probably change cells soon;

the second level is used to detect the fact that the terminal must change cells.

Figure 1:
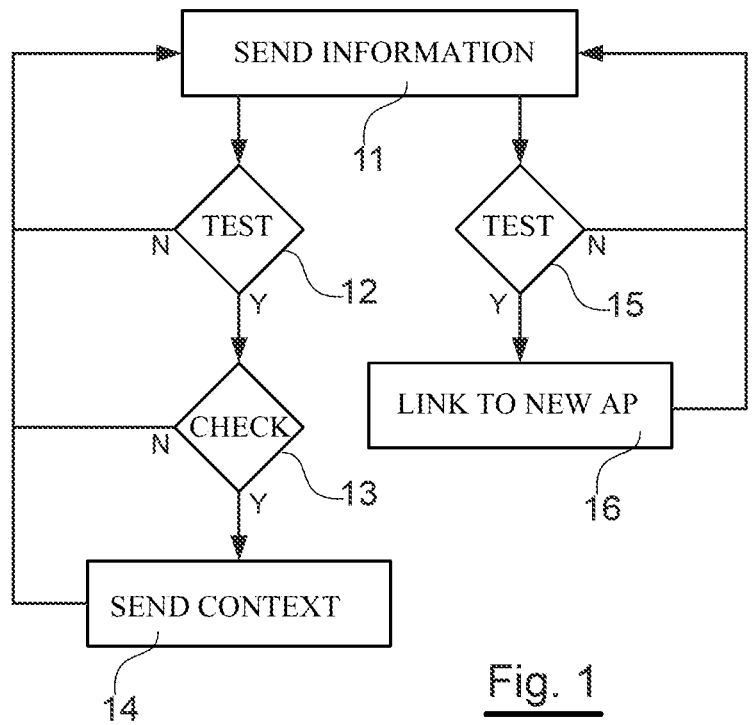
FIG. 1 is a simplified flowchart of the method of an embodiment of the invention.

Thus, as illustrated in FIG. 1, the method comprises the following steps:

sending items of information 11 from the terminal back to the mobility controller through the current access point; these items of information representing quality, for example a measurement of the power of the received radio signal with this access point (called a current access point) as well as the position of the terminal;

when the information representing quality corresponds to a weak signal below a first threshold (test 12), the mobility controller checks (13) to see whether the terminal is on the border of the zone, using information on position transmitted by the terminal;

If the answer is yes, the controller sends (14) the terminal a context to enable it to link up to another access point close to its position;

when the measurement of the signals sent back falls below a second threshold below the first (test 15), the terminal 16 is again is linked to the new access point defined in the context transmitted.

Thus, according to an embodiment of the invention, the changing of the point of attachment of the terminal is assisted by an entity in the network (a server or router) called a Mobility Controller (MC) which collects information on the network and on the terminal (for example location of the terminal, map of the access points etc). It is this entity that pre-selects a target access point by anticipation.

To prepare the handover, the terminal measures the quality of the radio signal only with its current access point. The terminal does not have to send the level of radio signal with its neighboring access points back to the network or even measure them. This limits the overload on the radio link and the energy consumption required by the terminal to perform the measurements.

The mobility controller determines and gives the terminal a context pertaining to the target access point as soon as the terminal is attached to the network and as soon as the radio measurement sent back by the terminal goes below a predefined threshold. This context is created even if the terminal is still under the coverage of its current access point (i.e. even if the link between the access point and the terminal is still of a quality sufficient to cover the terminal).

This context provides an identification of the target access point as well as preferably the information required to get associated with this access point (for example information needed for an authentication or a change of protocol or technology).

Thus, the context transmitted by the mobility controller to the terminal can furthermore indicate all or part of the information required (network prefix, default route etc) by the terminal to configure a valid address when the change in access point requires a change in network address. Thus, when a new context is created for the terminal (creation or updating), the terminal can automatically configure a valid address in advance which it could use as soon as it is attached to the target access point.

According to one alternative mode of implementation, the context generated by the MC can directly indicate the new address corresponding to the target access point. The MC of the target address is then constituted on the basis of the selection of the target access point which gives the corresponding network prefix and on the basis of the unique identifier of the terminal stored in the cache memory of the MC. This mechanism guarantees the uniqueness of the constituted address. The fact that the MC directly gives the MN the new network address of the MN enables the MN to reduce the duration of the address acquisition phase. Furthermore, the guarantee of the uniqueness of the address constituted reduces the phase of discovery of address duplication (DAD) at the terminal.

During a handover proper (when the second threshold has been crossed), the terminal makes a direct attempt to attach itself to a single access point, the pre-selected access point, without scrutinizing this selected access point: there is therefore no procedure of selection of access points. In other words, the phase of searching for an access point of the terminal present in all the prior art techniques is eliminated.

Thus, the pre-selection, at the terminal level, of the access point with which it must be associated is direct. The terminal does not maintain a list of access points likely to be able to receive it but stores only one target access point by anticipation.

In one alternative implementation, the MC can indicate a list of access points with which the terminal must try to associate itself. In this case, in the event of a failure of the association with the first access point listed, the terminal tries to get associated with the second access point, then the third one and so on and so forth. In the event of a failure with all the access points, the terminal can initiate a classic handover procedure (including a phase of searching for access points).

The approach by anticipation according to an embodiment of the invention simplifies and optimizes the processing operations. As soon as the MC sees that the established context is no longer valid, it requests a change in context, which the terminal implements on the basis of information on context for its target access point which it has already received while still under the coverage of its current access point (besides, in certain cases the change-over will not take place, for example if the terminal has changed direction).

The locating of the terminal can be done especially through geo-location means (for example GPS means) present in the terminal. In this case, the selection of the target access point by the MC can be done by prediction of the path of the mobile.

It can be planned that the message sent by the MC to the terminal will contain the new context indicating furthermore whether the terminal must immediately change over to the new access point mentioned or whether it should wait for its radio signal to go below a second threshold in order to change over to the new access point. This enables the MC to order the terminal to change the access point in also taking account of other information, for example data for loading access points and not only geolocation data.

When the association with an access point requires an authentication step (for example in the context of a WLAN type system with IEEE 802.11i), the terminal, when it receives the context of its target access point, can activate a pre-authentication procedure with its target access point through its current access point. This makes it possible, during the execution of the handover, to accelerate the step pf authentication with the access point target.

3. Example of Implementation

Figure 2:
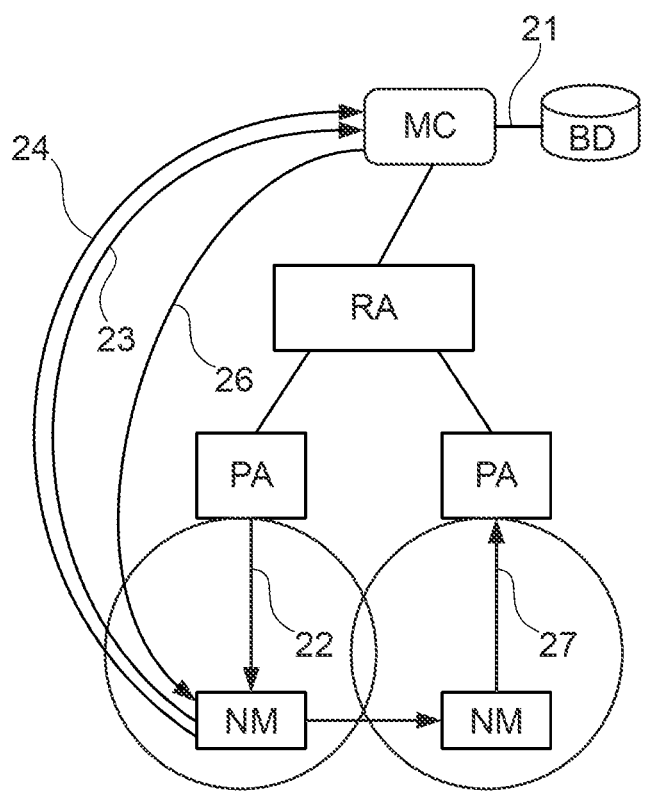
FIG. 2 illustrates the different data exchanges performed in a system implementing an embodiment of the method of FIG. 1.

FIG. 2 illustrates the different data exchanges according to an advantageous embodiment of the invention.

The MC obtains information from the AP of the domain (position, MAC address, channel, range, etc) by consulting (21) a database DB provided for this purpose.

Each terminal MN1 measures (22) the quality of transmission with its current AP and periodically sends (23) its current position, the current signal quality and its current AP to the MC.

When the signal quality in a mobile goes below a threshold S1, the terminal MN1 sends (24) a message to the MC containing the information cited here above, for example in the form of a single message comprising the fields [position, radio signal, current AP identifier]. FIG. 3A presents an example of a structure of a message of this kind, called a MUP message.

This message comprises the following fields:
MAC address of the terminal 21;
MAC address of the current AP 32;
current RSS information on the terminal 23;
position of the terminal 34.

When the MC receives a message of this kind from a mobile, it applies (35) a procedure of searching for a target AP described in FIG. 4 and commented upon here below. If a new context is created, the MC transmits it (36) to the MN. This context contains the means of identifying the target AP. FIG. 3B shows an example of a corresponding message structure (called a CT message). It comprises the following fields:
number of target APs transmitted 35;
a bit 36 used to request the terminal for immediate implementation of a "handover"; and
for each of the target APs, the fields (known per se):
a MAC address of the AP $37_1, 37_2 \ldots$;
an SSID identifier of the AP $38_1, 38_2 \ldots$;
an identifier of the channel of the AP $39_1, 39_2 \ldots$,
a length of the prefix CoA (which is the following field and is equal to 0 if it is not present) $310_1, 310_2 \ldots$;
an optional field CoA ("Care of Address") for $311_1, 311_2 \ldots$.

Finally, if a context is assigned to the MN and if its signal quality goes below a threshold S2, then this MN makes (27) a <<handover>> to the target AP (first AP indicated if a list is transmitted in the context), getting attached directly to the AP indicated (MN does not scrutinize the accessible PAs). The processing implemented by the terminal is described in greater detail here below, with reference to FIG. 5.

Figure 4:
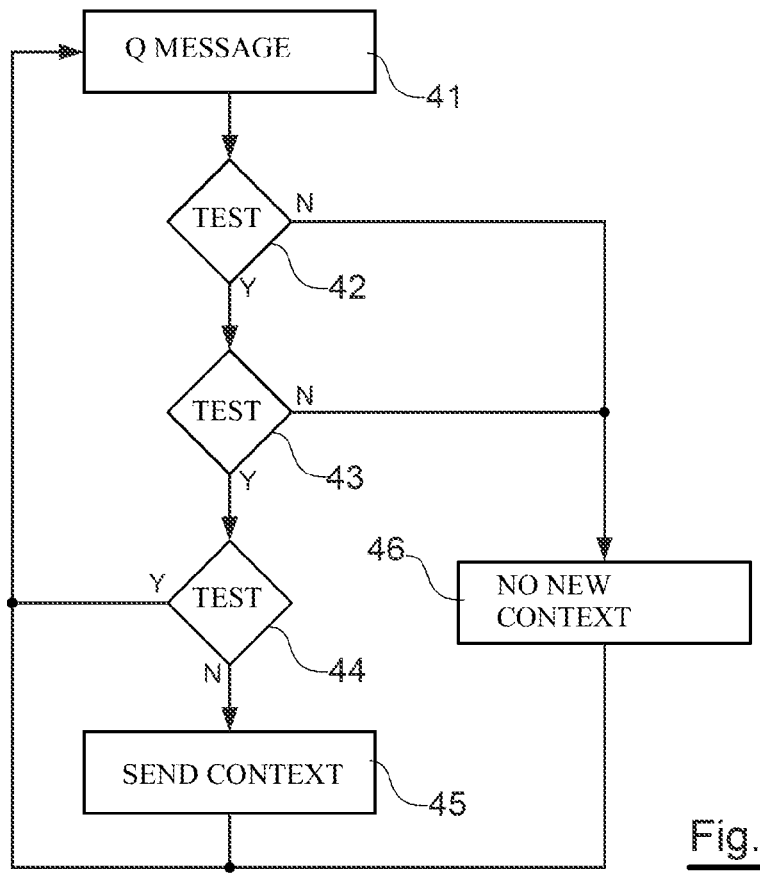
FIG. 4 is a simplified flowchart describing the steps implemented by a mobility controller in the system of FIG. 2.

A description is now given of the processing implemented by the mobility controller MC, according to the embodiment illustrated by FIG. 4.

From each terminal, the MC periodically receives (41) a message specifying the quality of the signal received and the position of the terminal (for example in the form illustrated in FIG. 3A). The quality of the signal, in the example considered, is proportional to the power received by the terminal.

If this power is lower than a first predetermined threshold S1 (test 42), then the MC determines (test 43) whether the mobile is at the boundary of coverage of the current cell (the poor quality could, as the case may be, have another cause) depending on the information on location.

If the response to both these tests 42 and 43 is positive, then the MC checks to see if it has already transmitted a valid target context to the terminal (test 44). If this is the case, there is nothing left to do, and the MC waits for a new message (41).

If not, it builds or updates the target context and sends it to the mobile (45).

When one of the tests 42 and 43 is negative, the MC can create (46) an entry specifying that there was no new target context for the time being ("target AP" context empty).

Then, the operation loops back to the step 41 to await a new message.

Figure 5:
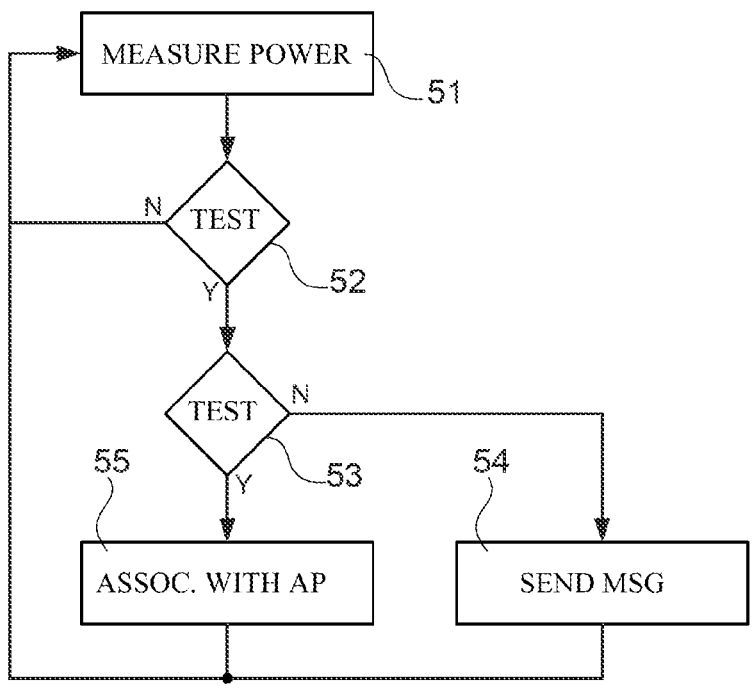
FIG. 5 is a simplified flowchart describing the steps implemented by a terminal in the system of FIG. 2.

FIG. 5 provides a schematic view of the processing implemented in the terminal, in an advantageous embodiment.

The terminal measures (51) the power of the signal received (and/or other information representing quality). If this power is above the threshold SI (test 52), then no processing is performed and the operation loops back to the measurement step 51.

If not, the power is compared with a second threshold S2 (test 53) that is more demanding than the threshold S1. If the power is between the thresholds S1 and S2, the terminal builds and sends (54) the MC a message stating that it is probably at the boundary of coverage, for example in the form illustrated by FIG. 38.

If the power is below S2, then it is necessary to carry out a handover. The terminal then gets associated with the AP identified in the previously received context (55).

In one particular example of implementation, the first threshold S1 has a value equal to −75 dBm and the second threshold S2 has a value equal to −78 dBm. Other values can of course be selected depending on need and on the characteristics of the technique used. Other criteria such as the following can also be used to judge quality:
- a received signal level;
- a change in mode of transmission and/or reception;
- a type of modulation used;
- a signal-to-noise ratio;
- an error rate;
- a collision rate;
- a mean access time;
- a rate of "data groups sent and not received";
- a data group (frames and/or packets) retransmission rate.

...

If necessary, several criteria can be used.

At the MC, the mobile terminal is considered to be close to the boundary of coverage for example when it is situated at a distance of over 20 m from its current access point.

4. Structure of a Terminal and Offer Mobility Controller

FIG. 6A shows the simplified structure of a mobility controller, with respect to an embodiment of the invention. This controller comprises a memory M 61, a processing unit 62 equipped for example with a microprocessor μP, and driven by a computer program Pg 63. At initialization, the code instructions of the computer program 63 are loaded for example into a RAM and then executed by the processor of the processing unit 62. At input, the processing unit 62 receives the data sent by the different terminals (for example in the format illustrated in FIG. 3A). The microprocessor μP of the processing unit 62 decodes this data 64 according to the instructions of the program Pg 63. The processing unit 62 outputs messages 65 (for example in the format illustrated in FIG. 3B), intended for the different terminals.

FIG. 6B shows the simplified structure of a terminal, with respect to an embodiment of the invention. This terminal comprises a memory M 71, a processing unit 72 equipped for example with a microprocessor μP, and driven by a computer program Pg 73. At initialization, the code instructions of the computer program 63 are loaded for example into a RAM and then executed by the processor of the processing unit 72. At input, the processing unit 72 receives the data sent by the mobility controller (for example in the format illustrated in FIG. 3B). The microprocessor μP of the processing unit 72 decodes this data 74 according to the instructions of the program Pg 73. The processing unit 72 outputs messages 75 (for example in the format illustrated in FIG. 3A), intended for the mobility controller.

Advantageously, the terminal also has means 76 for measuring a quality criterion, for example the power of the signal received.

An embodiment of the invention provides a technique for improving and simplifying handover operations between two cells when a terminal passes from one cell to another.

In particular, an embodiment of the invention provides a technique of this kind that simplifies the processing operations performed in the terminals and/or accelerates handover operations between two cells.

Although the present disclosure has been described with reference to one or more examples, workers skilled in the art will recognize that changes may be made in form and detail without departing from the scope of the disclosure and/or the appended claims.

The invention claimed is:

1. A method of controlling allocation of at least one access point to a mobile terminal present in a cellular network formed by a plurality of cells each controlled by an access point, implemented in a mobility controller, wherein the method comprises the following steps:
    receiving information on location transmitted by the mobile terminal;
    determining, based on said information on location, a target context comprising at least one identifier of at least one access point towards which said mobile terminal is likely to move, the identifier of said at least one access point comprising a MAC address and an SSID identifier, said target context further comprising information required by said mobile terminal to connect to said at least one access point and, for a given access point of said at least one access point, an address of said mobile terminal; and
    transmitting said target context to said mobile terminal only when an analysis of the location indicates that said mobile terminal is in the vicinity of a target cell, according to a predetermined criterion of location.

2. The method according to claim 1, wherein said target context also comprises at least one of the pieces of information belonging to the group consisting of:
    security information;
    encryption information;
    authentication information; and
    information on a technique of access and/or transmission implemented by the target access point.

3. The method according to claim 1, wherein said target context further comprises, for a given access point of said at least one access point, an identifier of a channel of said given access point.

4. The method according to claim 1, wherein said target context further comprises an information used to request the mobile terminal for immediate implementation of a handover process.

5. A method of connecting to an access point implemented in a mobile terminal present in a cellular network formed by a plurality of cells each controlled by an access point, wherein the method comprises the following steps:
    location of said mobile terminal inside a current cell and transmission of information on location to a mobility controller;
    reception of a target context comprising at least one identifier of at least one access point towards which the mobile terminal is likely to move, the identifier of said at least one access point comprising a MAC address and an SSID identifier, said target context further comprising information required by said mobile terminal to connect to said at least one access point and, for a given access point of said at least one access point, an address of said mobile terminal, said target context being received by said mobile terminal only when said mobile terminal is in the vicinity of a target cell, according to a predetermined criterion of location.

6. The method according to claim 5, wherein step of reception of a target context is followed by a step of preparation of a connection procedure to said at least one access point on the basis of said target context.

7. The method according to claim 5, wherein said locating step is implemented when at least one predetermined quality criterion has reached a first threshold.

8. The method according to claim 7, wherein a predetermined cell change criterion is identical to at least one of said predetermined quality criteria, a connection of said mobile terminal to one of said at least one access point being implemented when a second threshold is reached by said predetermined cell change criterion.

9. The method according to claim 5, wherein said step of location of said mobile terminal is implemented by said mobile terminal and comprises the following steps:
- detecting that at least one predetermined quality criteria has reached a first corresponding threshold;
- determining the location of said mobile terminal; and
- transmitting location coordinates to a mobility controller so that this controller can determine at least one target cell.

10. A mobile terminal to be implemented in a cellular network formed by a plurality of cells each controlled by an access point, wherein the mobile terminal comprises:
- means for locating the mobile terminal inside a current cell and for transmitting information on location to a mobility controller;
- means for receiving a target context comprising at least one identifier of at least one access point of a target cell towards which the mobile terminal is likely to move, the identifier of said at least one access point comprising a MAC address and an SSID identifier, said target context further comprising information required by said mobile terminal to connect to said at least one access point and, for a given access point of said at least one access point, an address of said mobile terminal said target context being received by said mobile terminal only when said mobile terminal is in the vicinity of a target cell, according to a predetermined criterion of location;
- means for preparing a connection procedure to at least one of said at least one access point based on said target context; and
    - means for connecting said mobile terminal to one of said at least one access point according to a predetermined cell change criterion.

11. The mobile terminal according to claim 10, further comprising means for assessing at least one quality criterion driving at least one of said means for transmitting location information or said means for connecting.

12. A mobility controller of a cellular network formed by a plurality of cells each controlled by an access point, wherein the mobility controller comprises:
- means for receiving information on location transmitted by a mobile terminal;
- means for determining, on a basis of said information on location, a target context comprising at least one identifier of at least one access point towards which said mobile terminal is likely to move, the identifier of said at least one access point comprising a MAC address and an SSID identifier, said target context further comprising information required by said mobile terminal to connect to said at least one access point and, for a given access point of said at least one access point, an address of said mobile terminal; and
- means for transmitting said target context to said mobile terminal only when an analysis of the location indicates that said mobile terminal is in the vicinity of a target cell, according to a predetermined criterion of location.

13. A computer program product stored in a non-transitory computer-readable medium, which comprises program code instructions for implementation of a method to connect to an access point implemented in a mobile terminal present in a cellular network formed by a plurality of cells each controlled by an access point, wherein the method comprises the following steps:
- locating said mobile terminal inside a current cell and transmitting information on location to a mobility controller;
- receiving by anticipation a target context comprising at least one identifier of at least one access point towards which the mobile terminal is likely to move, the identifier of said at least one access point comprising a MAC address and an SSID identifier, said target context further comprising information required by said mobile terminal to connect to said at least one access point and, for a given access point of said at least one access point, an address of said mobile terminal, said target context being received by said mobile terminal only when said mobile terminal is in the vicinity of a target cell, according to a predetermined criterion of location.

14. A computer program product stored in a non-transitory computer-readable medium, which comprises program code instructions for implementation in a mobility server of a method to control allocation of at least one access point to a mobile terminal present in a cellular network formed by a plurality of cells each controlled by an access point, wherein the method comprises the following steps:
- receiving information on location transmitted by the mobile terminal;
- determining, based on said information on location, a target context comprising at least one identifier of at least one access point towards which said mobile terminal is likely to move, the identifier of said at least one access point comprising a MAC address and an SSID identifier, said target context further comprising information required by said mobile terminal to connect to said at least one access point and, for a given access point of said at least one access point, an address of said mobile terminal; and
- transmitting said target context to said mobile terminal only when an analysis of the location indicates that said mobile terminal is in the vicinity of a target cell, according to a predetermined criterion of location.

* * * * *